UNITED STATES PATENT OFFICE.

ANTON A. LERAAS, OF SPOKANE, WASHINGTON.

DETERGENT FOR CLEANING AND POLISHING PURPOSES.

1,211,188.  Specification of Letters Patent.  Patented Jan. 2, 1917.

No Drawing.   Application filed September 27, 1915.   Serial No. 52,855.

*To all whom it may concern:*

Be it known that I, ANTON A. LERAAS, a citizen of the United States of America, residing at Spokane, in the county of Spokane and State of Washington, have invented a new and useful Detergent for Cleaning and Polishing Purposes, of which the following is a specification.

My invention relates to a detergent for polishing, cleaning, and preserving all painted, varnished, and finished woodwork, metal, hard wood, leather, and hard surfaces.

The object of my invention is to provide a composition for cleaning and polishing which will be efficient, cheap to manufacture, and will thoroughly clean a surface to which it is applied, and give to such surface a highly finished appearance which will last a comparatively long time; and with these objects in view my invention consists of the novel combination of ingredients hereinafter fully pointed out.

In the practice of my invention, I use salt which has previously been dissolved in water, and boiled and then cooled, and mix the same with buttermilk; I then add paraffin oil, turpentine, and denatured alcohol, water, oil of cedar leaves, and a suitable dye, or coloring matter, the whole to be agitated until thoroughly mixed.

My preferred embodiment is prepared in the following manner: 36 ounces of fresh buttermilk; 4 ounces of salt which has previously been dissolved in 6 ounces of water and boiled and cooled; 36 ounces of paraffin oil; 18 ounces of turpentine; 18 ounces of denatured alcohol; 12 ounces of water; 1 ounce of oil of cedar leaves; 1/35 ounce of dye (preferably medium garnet) which has previously been dissolved in 1 ounce of denatured alcohol; the whole to be agitated until thoroughly mixed. The compound to be shaken before using. This composition is a thorough cleaner and will be found to give a high and lasting polish to all hard surfaces.

While I have stated the preferred proportions of ingredients to be used in making this composition, I do not wish it understood these proportions cannot be varied to some extent, therefore I do not wish to be limited to the exact proportions of ingredients set forth, but wish to avail myself of such variations as may come within the scope of my claims.

What I claim is:

1. The herein described composition of matter for cleaning and polishing, consisting of buttermilk, salt, paraffin oil, turpentine, denatured alcohol, water, oil of cedar leaves, and a coloring matter.

2. The herein described composition of matter for cleaning and polishing, consisting of the following ingredients in the following proportions by weight: fresh buttermilk thirty-six parts, salt four parts, paraffin oil thirty-six parts, turpentine eighteen parts, denatured alcohol eighteen parts, water eighteen parts, oil of cedar leaves one part, dye one-thirty-fifth part which has previously been dissolved in one part of denatured alcohol.

In testimony whereof I affix my signature in the presence of two witnesses.

ANTON A. LERAAS.

Witnesses:
 JESSIE M. SCOTT,
 C. D. RANDALL.